United States Patent [19]

Hujsak

[11] Patent Number: 4,524,552
[45] Date of Patent: Jun. 25, 1985

[54] MECHANISM FOR DEPLOYING A DEPLOYABLE TRUSS BEAM

[75] Inventor: Edward J. Hujsak, La Jolla, Calif.

[73] Assignee: General Dynamics Corporation/Convair Div., San Diego, Calif.

[21] Appl. No.: 310,195

[22] Filed: Oct. 9, 1981

[51] Int. Cl.³ .............................................. E04H 12/18
[52] U.S. Cl. ........................................ 52/108; 52/645; 52/749; 244/59
[58] Field of Search ................ 52/645, 749, 108, 121, 52/117, 646, 173; 244/158, 159, 173

[56] References Cited

U.S. PATENT DOCUMENTS

| | | | |
|---|---|---|---|
| 2,855,617 | 10/1958 | Broms | 52/646 X |
| 3,751,863 | 8/1973 | Lyons | 52/645 X |
| 4,115,975 | 9/1978 | Bliss | 52/646 |
| 4,237,662 | 12/1980 | Kinzler | 52/745 X |

FOREIGN PATENT DOCUMENTS

| | | | |
|---|---|---|---|
| 2074981 | 11/1981 | United Kingdom | 244/158 R |
| 586246 | 12/1977 | U.S.S.R. | 52/646 |

*Primary Examiner*—John E. Murtagh
*Assistant Examiner*—Kathryn Ford
*Attorney, Agent, or Firm*—John R. Duncan

[57] ABSTRACT

A deployment system for a deployable truss structure particularly adapted to space applications which has high structural efficiency and can be remotely operated in a controlled, sequential manner. The truss in its deployed configuration exhibits a "diamond" cross section. Each of the four sides of the structure is essentially a "Warren" truss. Diagonals on the opposite sides of each diamond incorporate a mid-span hinge and the other two diagonals are rigid tubes. When packaged, all elements of the truss are folded so that they are parallel to one another and contained between two guide rails. The guide rails are located on either side of the diamond truss. The horizontal strut connection points or nodes are fitted with rollers that are locked in the guide rails for movement therealong. The deployment initially lifts upright truss members to the vertical position, forming the basic diamond shape of the truss. A traveling deployment mechanism on each guide rail including unlocking and transport devices on an endless tape unlocks the node of the first truss bay and carries it to its deployed length. Sequentially, the tape is reversed and the devices return to the next node, to unlock it, and deploy each next bay. As the truss grows, the bays are cantilevered beyond the guide rails. The deployment mechanism can be manually operated through hand-held controllers or by an automatic programmed system, as desired.

7 Claims, 11 Drawing Figures

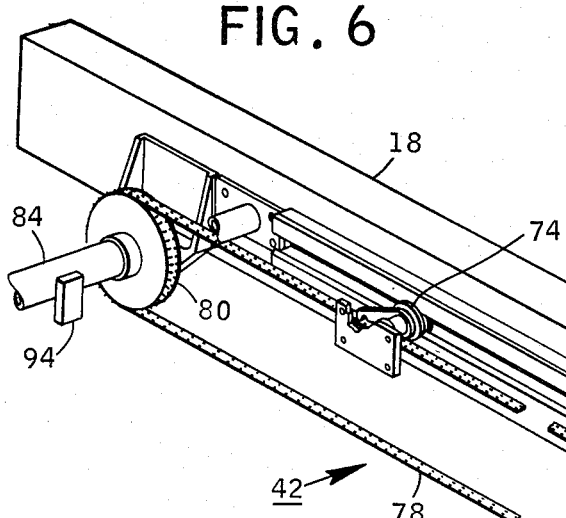
FIG. 6
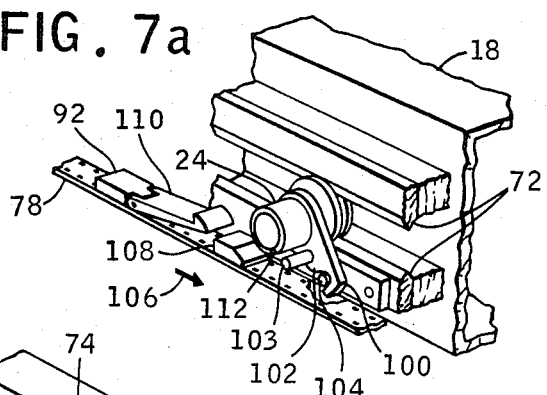
FIG. 7a
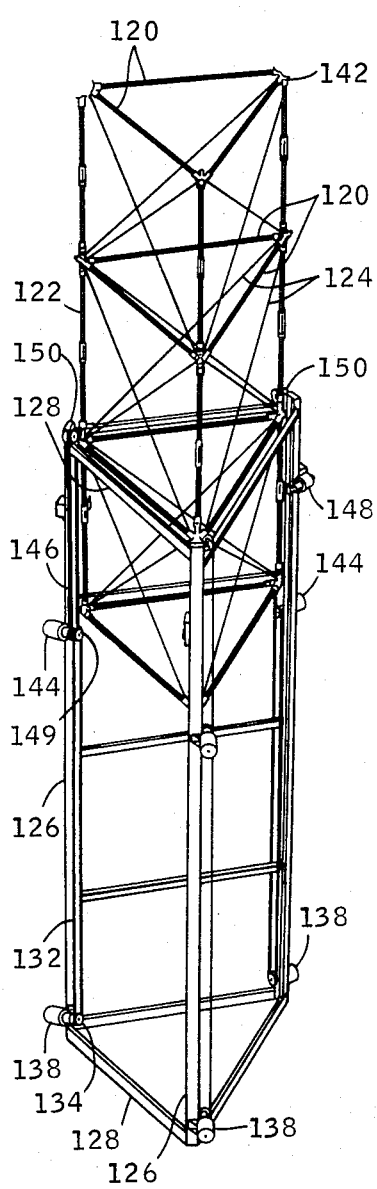
FIG. 9
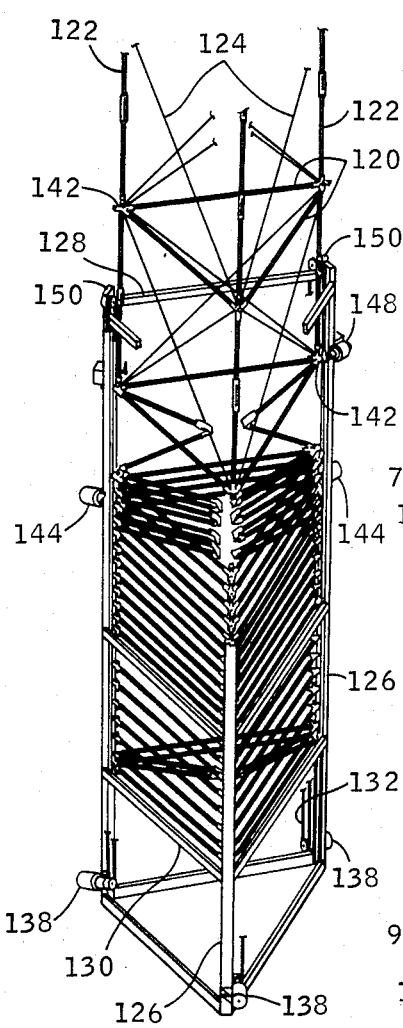
FIG. 8
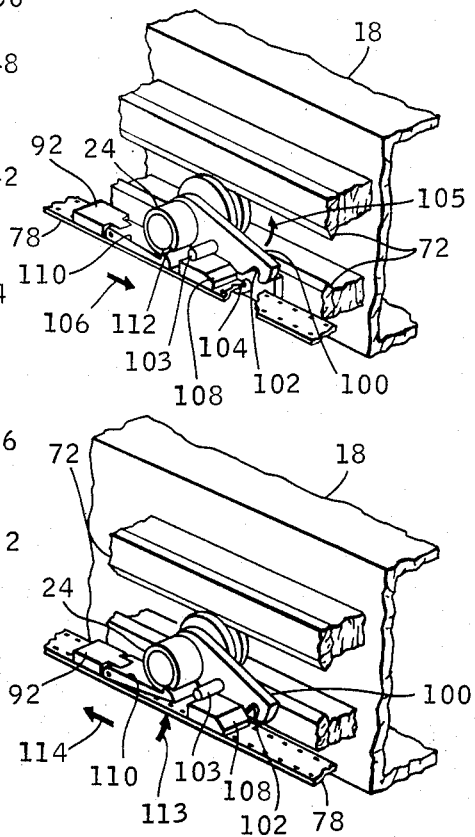
FIG. 7b
FIG. 7c

MECHANISM FOR DEPLOYING A DEPLOYABLE TRUSS BEAM

BACKGROUND OF THE INVENTION

This invention relates in general to the erection of truss structures and, more particularly, to remotely operable mechanism for deploying deployable truss structures adapted to space applications.

A variety of expandable or deployable structures have been designed for specific space applications, such as the solar panel deployment system described in U.S. Pat. No. 4,116,258 and the parabolic antenna structure described in U.S. Pat. No. 3,783,573. While these structures have been very effective in meeting specialized needs, requirements are developing for long, truss beam like structures. For example, crowding of available orbital slots for communication satellites at geosynchronous altitude could be decreased if a number of such satellites were mounted at the ends of beams extending from a common hub in a "spider" like arrangement. Long beams also would be useful in very large solar panel assemblies, large phased array antennas, etc.

Presently, large space structures can be erected in space through one or a combination of three techniques. Components (e.g., struts, nodes) can be launched into orbit and assembled by astronauts working outside. Deployable structures can be folded into a small volume, carried into orbit, then deployed to the final configuration. Or, beams can be fabricated in space from coils or reels of raw materials.

Each of these large space structure assembly techniques has limitations. Astronaut assembly from small components is obviously time consuming and may be dangerous. On-orbit manufacture requires is large and expensive space based manufacturing facility and is only feasible for very large structures. In the past, deployable structures have been limited by the high ratio of stored volume to deployed volume which limited the size of the structure which could be produced. Also, automatic uncontrolled deployment, such as by springs, was susceptible to jams and other mechanical hangups which can prevent full deployment.

Deployable beams, with a sufficiently high packing ratio and means for simple, controllable deployment would meet many space structures needs, especially in the geosynchronous communication satellite area. A deployable beam meeting the required structural criteria is described in copending U.S. patent application Ser. No. 310,194, filed concurrently herewith.

Mechanisms proposed for deployment of deployable beams have, in the past, been extremely cumbersome and heavy. Most have operated automatically once the deployment sequence began. Those systems were incapable of being stopped after partial deployment and restarting as desired. Thus, any jams or mechanical problems during deployment could result in damage to the structure and permanent jamming in a partially deployed state. Thus, there is a continuing need for improvements in mechanisms for deployment of deployable beams for space applications to overcome the above-noted problems.

SUMMARY OF THE INVENTION

The above problems, and others, are overcome by a deployment mechanism for moving a deployable truss beam assembly from a first or packed position where certain of the struts making up the truss are folded at about their midpoint in such a way to permit the assembly to be packed in a tight, flat arrangement to a second or deployed position in which the struts are extended between node fittings to form a diamond or Warren truss. The assembly to be deployed basically comprises a pair of spaced substantially parallel guide rails, attached at one end to a suitable base structure, such as a satellite hub, a mount in a space shuttle cargo bay, etc. Horizontal node fittings are arranged to ride along the inner sides of the guide rails and are locked thereto in the stored or packed position. Side longitudinal struts extend between adjacent horizontal node fittings along the rails and cross struts extend across the guide rails to opposite nodes. Diagonal struts extend above and below the guide rails from horizontal nodes to upper and lower nodes, while upper and lower longitudinal struts extend between adjacent upper and lower node fittings. All longitudinal and cross struts and half of the diagonal struts have hinge means at about their midpoints to allow those struts to fold about 180° during movement between deployed and packed arrangements.

When the deployment sequence begins, the struts are folded into a flat pack between the guide rails, with all struts substantially parallel to each other and substantially perpendicular to the guide rails. A deployment arm mechanism first raises and lowers the upper and lower node fittings, respectively, to unfold the folded diagonal struts and extend the rigid diagonal struts. A tight, diamond-shaped stack results. The lifting mechanism includes two pairs of support arms above and below on opposite sides of the packed strut array supporting a channel which extends along in contact with the unhinged or rigid diagonal struts. Hooks on the channels lock the struts to the channels. As the support arms are pivoted, the hooks carry the struts to the erect position. Then, hook release means is activated to release the now diamond-shaped diagonal struts configuration for further deployment.

Next, a traveling mechanism on each guide rail unlocks the first horizontal nodes and moves them along the guide rails to extend the folded longitudinal struts and form the first truss bay. The traveler then returns to the second set of horizontal nodes, unlocks them and moves them along the guide rail to open the second bay and move the already deployed first bay toward the end of the guide rails. Sequentially, the remaining bays are deployed and the truss structure is cantilevered beyond the guide rails. The traveling deployment mechanism basically comprises two endless tapes each positioned for movement along the guide rails adjacent to the horizontal nodes. An unlocking device on each tape first unlocks the outermost node, then a latch device latches to those nodes and, as the tape is moved, carries those nodes toward the outer end of the guide rails. When the first bay is fully deployed, the tape direction is reversed to return the unlocking and latching devices to the second set of horizontal nodes, with deployment continuing sequentially. This sequence can be stopped at any time for installation of components or by an observer or automatic device detecting a deployment problem. The problem can be corrected and deployment restarted as needed. During the deployment process, the deployment mechanisms can be operated at varying rates and can be stopped or started at any time to allow for a carefully controlled sequence of component or subsystems installation operations and to provide opportunity for inspection and/or verification of operations. The truss structure is redundant in that a failure of any of its members will still provide a stable truss. For operations in space, this feature allows the repair or replacement of a member to be made before continuing the deployment sequence. The truss can be deployed on Earth, adjusted as detailed below, then packed for launch into space with correct deployment and exact final configuration assured.

BRIEF DESCRIPTION OF THE DRAWING

Detals of the invention, and of a preferred embodiment thereof, will be further understood upon reference to the Drawing, wherein:

FIG. 6 is a perspective view of the horizontal node deployment device;

FIGS. 7a, 7b and 7c are perspective views showing sequential operation of the node unlocking and carrier latching mechanisms;

FIG. 8 is a perspective view of an alternative embodiment of the truss packing and deployment system during an early stage in deployment; and FIG. 9 is a perspective view of the embodiment of FIG. 8 at the conclusion of deployment.

DETAILED DESCRIPTION OF THE INVENTION

Figure 1:
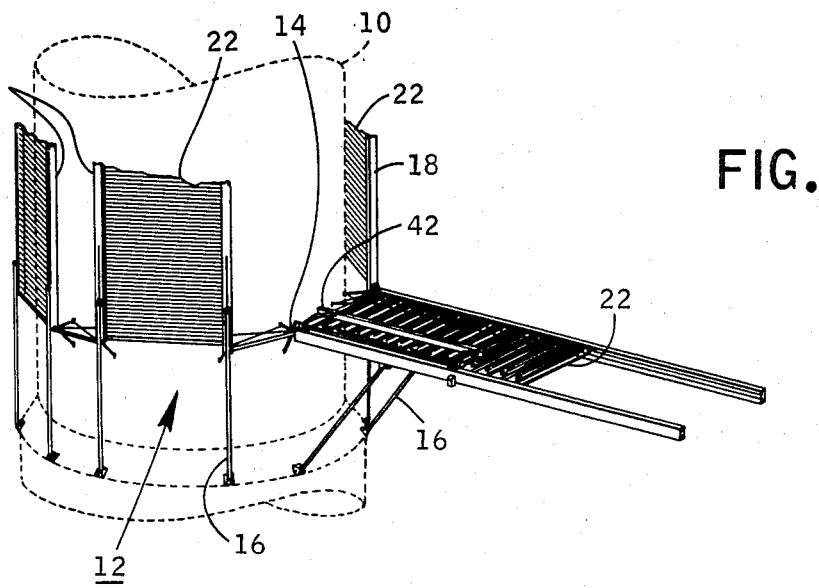
FIG. 1 is a schematic perspective view of packed truss assemblies mounted on a spacecraft with one assembly ready for deployment.

Referring now to FIG. 1, there is seen a schematic representation of a spacecraft 10 acting as a hub or support for a plurality of stored deployable truss assemblies 12. One truss assembly 12 is shown extended outwardly from the side of space vehicle 10, supported by hinges 14 and brace 16 in a conventional manner. Truss assemblies 12 are deployed from the stored position to the extended position by the mechanisms, illustrated in FIGS. 4–7 as described below.

Assembly 12 as seen in FIG. 1 includes a pair of substantially parallel guide rails 18. The inner surface of each rail 18 includes a guide means 20, as detailed below. The packed struts 22, most of which are folded (with certain rigid struts, as described below) are retained in the space between guide rails 18. The guide rails thus serve as a load restraint device to protect the truss members and react launch loads.

Figure 2:
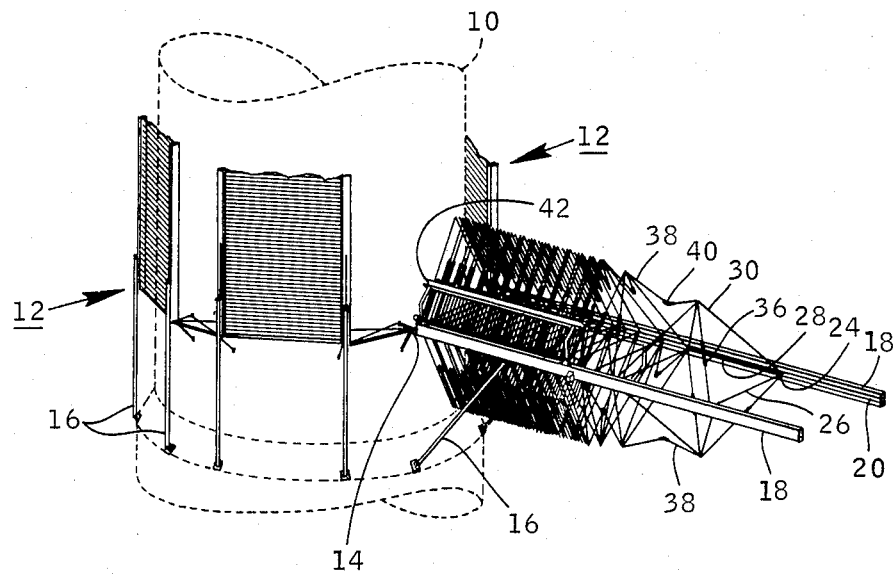
FIG. 2 is a schematic perspective view of the truss assembly during an early deployment stage.

The next step in the deployment sequence, the erection of the diagonal struts, is schematically illustrated in FIG. 2. A plurality of horizontal node fittings 24 are arranged along the inside of each guide rail 18. Cross struts 26 extend across between opposite horizontal node fittings 24. Side longitudinal struts 28 extending between adjacent horizontal node fittings 24 are folded about a hinge 29 at their midpoints in pack 22 (as most clearly seen in FIG. 3). Diagonal struts 30 extend upwardly and downwardly from horizontal node fittings 24 to upper and lower node fittings 32, respectively. Some of the diagonal struts have hinges 36 at their midpoints to allow folding for packing. In a preferred arrangement, looking from the end of the pack, the diagonals on two opposite sides of the diamond truss formed by the diagonal struts 30 have hinges while those on the other two opposite sides do not. Upper and lower longitudinal struts 38 have hinges 40 near the midpoints of struts 38 allow them to fold for packing. Node fittings 24 and 32 and hinges 40 are described in detail in copending U.S. patent application Ser. No. 310,194 filed concurrently herewith. The diagonal struts are lifted into the erect position by support arm sets 48 which are positioned adjacent to the rigid (rather than hinged) diagonal struts 30. This mechanism is described in detail in conjunction with the description of FIGS. 4 and 5, below.

A traveler mechanism 42 (not shown in FIGS. 1–3 for clarity but detailed in FIGS. 6 and 7 and described below) on each guide rail is actuated after diagonal struts 30 are erected. A latch means engages the outermost horizontal node fitting 24 on each side and moves it toward the end of the guide rails 18, causing the longitudinal struts 28 and 38 to unfold, forming the first truss bay. When the first bay is fully deployed (and latched inpplace by the over center hinges shown in FIGS. 9 and 10 of copending U.S. patent application Ser. No. 310,194, filed concurrently herewith) traveler mechanism 42 releases the first pair of horizontal node fittings 24 and moves back along guide rails 18 to engage and unlock the second pair of horizontal node fittings 24. As the second pair of node fittings 24 is moved toward the open end of guide rails 18, the second truss bay unfolds and the first bay is moved the corresponding distance.

Figure 3:
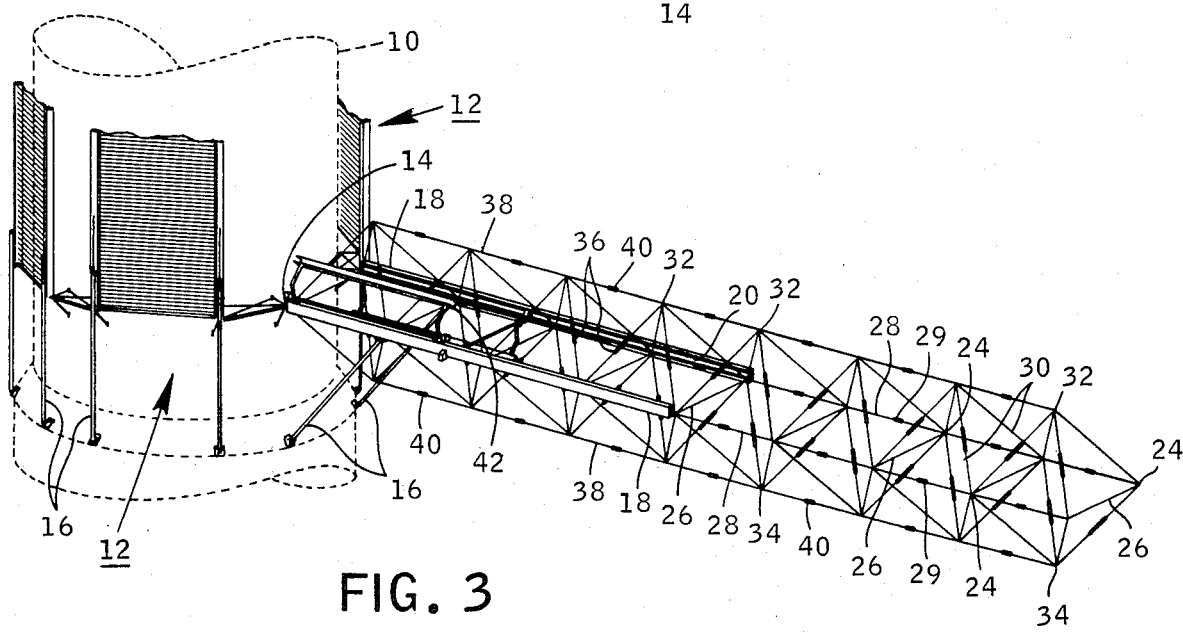
FIG. 3 is a schematic perspective view of an eight-bay truss fully deployed.

The deployment of succeeding truss bays continues until the entire assembly is extended as seen in FIG. 3. While an eight-bay truss is illustrated for simplicity, a much longer truss could be similarly deployed. As seen, most of the truss assembly extends beyond guide rails 18, since the primary strength of the assembly is in the truss arrangement, the guide rails being merely a deployment means. Once all of the truss assemblies 12 on spacecraft 10 have been deployed, additional structure may be attached thereto as desired. For example, suitable antenna fabric may be attached to the truss assemblies to produce a very large phased array antenna. Or, communication devices may be attached to the ends of trusses as desired. Of course, such devices could have been attached to the first bay prior to truss deployment, if desired.

Figure 4:
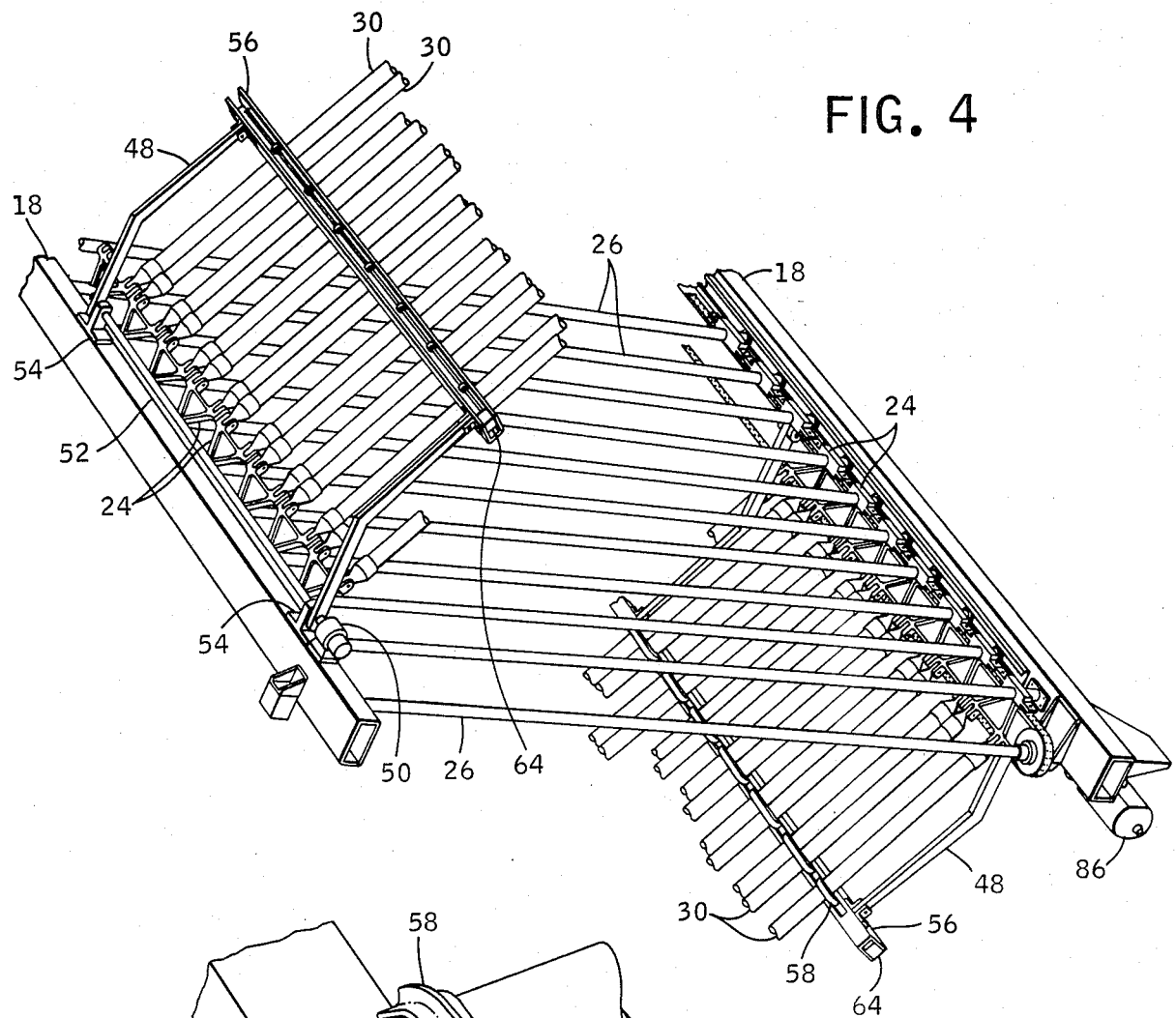
FIG. 4 is a perspective view, partially cut-away of the diagonal strut lift device.
Figure 5:
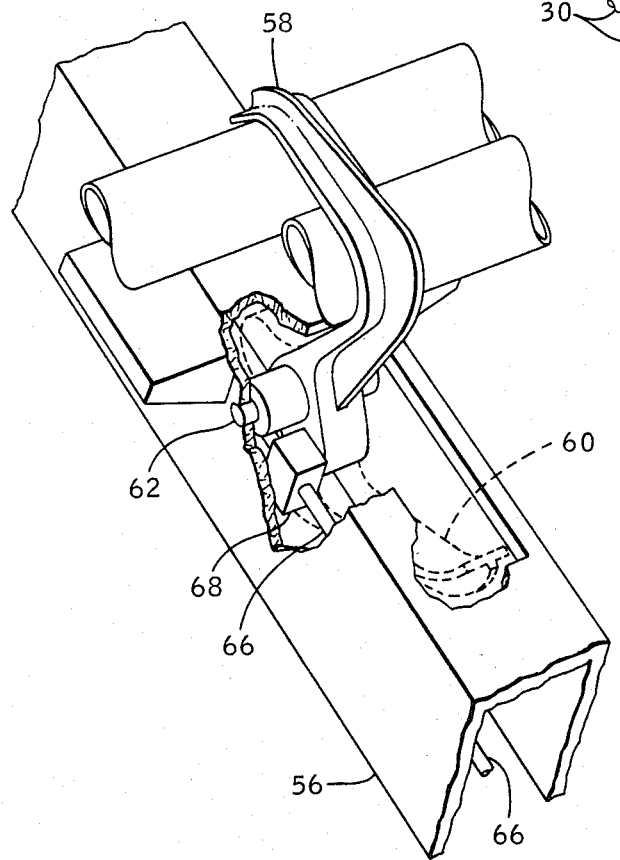
FIG. 5 is a perspective view of the diagonal strut hook retaining device.

Details of the diagonal strut lift mechanism are illustrated in FIGS. 4 and 5. FIG. 4 is a perspective view of the assembly from the end mounted on hinge 14, looking toward the open end of guide rails 18, immediately after diagonal struts 30 have been lifted from the flat packed arrangement of FIG. 1 to the position of FIG. 2.

A pair of vertical lift support arms are positioned on guide rails 18, on one side above and the other below the plane of the rails. A drive motor 50 moves arms 48 from the lower, strut-packed, position to that shown in FIG. 4 by rotation of rod 52, rotating arms 44 about pivots 54. A channel member 56 abuts diagonal struts 30 and is secured to arms 48.

A plurality of hooks 58 are mounted along channels 56 to hold struts 30 against channel 56 during lifting. As indicated in broken lines 60 in FIG. 5, hooks 58 are pivotable about pivot 62 to release struts 50 after they have been lifted to the fully upright position and the hinges 36 have fully opened (as shown in FIG. 2).

Hooks 58 are released by a linear motor or solenoid 64. A rod 66 extends from linear motor 64 along channel 66 through pivotably mounted blocks 68 on each hook 58. Blocks 68 are secured to rod 66 by set screws (not shown). As rod 66 is moved to the left as seen in FIG. 5, hooks 58 are rotated about pivots 62 to the position shown in broken lines 60, releasing all struts 30 for further deployment.

Longitudinal deployment of the truss, shown during initial deployment in FIG. 2, utilizes traveler mechanisms 42 working along guide means 20 on the insides of the guide rails, as illustrated in FIGS. 4, 6 and 7. A pair of steel "V-rails" 72 are attached to the box beam making up guide rails 18. Guide wheels 74 are fastened to support plates 76 which carry horizontal node fittings 24 and ride inside the V-rails 72. One support plate 76 and guide wheel 74 is provided on each horizontal node 24 to be deployed. For clarity, only two are shown in FIG. 6.

A perforated tape 78 is threaded over drive sprocket 80 and idler sprocket 82. While any suitable drive tape, belt, or chain may be used, for simplicity, low weight and high strength a 16 mm stainless steel tape, about 0.005 in. thick, similar to a motion picture film, is preferred.

Drive sprockets 80 on each guide rail 18 are connected by a drive shaft 84 which is driven by drive motor 86.

A tension adjustment means 88 is provided at idler sprocket 82 so that the sprocket mount (not shown) can be adjusted through screw 90 in a conventional manner to selectively tension drive tape 78.

A drive latch mechanism 92 is attached to each tape 78 at the same location. This mechanism 92 provides for engagement of tape 78 with the truss beam horizontal nodes 24 through support 76 for deployment. The tape operates in an oscillatory mode, deploying one bay at a time, and returning after each deployment to pick up the next bay. A digital shaft encoder 94 or other means of shaft encoding may be positioned on drive shaft 84 to indicate shaft and drive latch 92 position. The assembly may be operated by an automatic pre-programmed system or by a hand held controller.

The sequence of operation of the drive latch mechanism 92 during deployment is illustrated in FIGS. 7a, b and c, each of which is a cut-away detail of a portion of rail 18 at one node 24. During launch of the space vehicle or shipment of the stored or packed assembly, each node 24 is locked in place by a node lock arm 100 which is biased clockwise so that notch 102 in arm 100 engages a pin 104 on lower V-rail 72. Arms 100 may be biased clockwise either by the force of gravity (on earth) or a conventional spring between fitting and arm (not shown). As drive latch 92 approaches locked node 24 as indicated by arrow 106, a ramp means 108 engages the lower surface of pin 103 on arm 100, lifting notch 102 out of engagement with locking pin 104, as indicated by arrow 105 in FIG. 7b. An upwardly biased latch arm 110 then comes into engagement with a notch 112 as mechanism 92 continues to move in the direction of arrow 106. The slight upward force on latch arm 110 may be provided in any conventional manner, such as by a torsion spring at the pivot point or a compression coil spring or compressible elastomeric pad between arm 110 and the upper surface of tape 78. Deployment of the unlocked node 24 begins with the reversal of tape movement direction. As latch mechanism 92 begins to move in the direction of arrow 114, latch arm 110 moves into engagement with notch 112 as indicated by arrow 113 and pulls node 24 to the fully deployed position. Once full deployment is accomplished, tape direction again reverses and latch mechanism 92 returns to engage the next node. The angle of engagement between latch arm 110 and notch 112 is such that automatic disengagement is accomplished upon tape reversal.

Thus, rapid and precise deployment is accomplished under either automatic or manual control. The system can be stopped at any point for installation of equipment, repair, or adjustment.

FIGS. 8 and 9 schematically illustrate (partially cutaway) an alternative embodiment of a truss packing and storage system using the tape drive truss deployment system described above.

In this embodiment, the deployed truss has a triagonal cross-section made up of rigid un-hinged, triangle struts 120 and hinged longitudinal struts 122. A preferred hinge for use in struts 122 in the over-center hinge detailed in copending U.S. patent application, Ser. No. 310,194 filed concurrently herewith. Cord diagonals 124 extend between each corner of one set of triangle struts 120 and the two opposite corners of the next triangle, as shown. These cords are preferably made of steel, glass or aramid fibers.

The struts are stored in a closely packed arrangement between three guide rails 126 as seen in FIG. 8. Beams 128 at each end of rails 126 maintain the guide rails in the proper relationship. The lower end of the strut stack is supported on movable support member 130 adjacent to a cartridge feed system 131. Support members 130 is in the form of a triangle within guide rails 126 and movably mounted at the three corners on three endless perforated tapes 132 of the sort shown in FIG. 6 for movement upwardly and downwardly with the tapes. The tapes 132 are threaded around drive sprockets 134 and idler sprockets 149 and are driven by drive motor 138 in the same manner as tape 78, described above, is driven. The idler sprockets, may be located on the shaft of drive motor 144, mounted for free rotation relative to that shaft.

Guide nodes 142 at the corners of triangular struts 120 slide or roll along guide means on rails 126. Individual nodes 142 are not locked to the guide rails during storage.

The tape deployment drive system 143 is generally similar to that shown in FIGS. 6 and 7, except that the strut unlocking mechanism is omitted. Deployment drive is accomplished by three drive motors 144. Each includes an endless tape 146 threaded over drive and idler pulleys 150 and carrying a node latch system similar to that illustrated at 92 in FIG. 7.

An overcenter hinge drive means 14 serves to actuate the hinge to its locked position, providing the force necessary to place the diagonal cords 124 in tension. The same device serves to unlock the hinge automatically if the truss is to be retracted.

During the deployment sequence, the cartridge drive system is operated through drive motor 138 and tape 132 to lift support 130 sufficiently to bring the uppermost stored nodes 142 into an engageable relationship with the deployment drive system 143. First, the deployment drive 144 deploys the truss beam bay until the hinges are in a near-lock position, but the diagonal cords are not yet tensioned. Then the overcenter hinge drive 144 engages the hinge and pulls it to a locked position. Upon completion of the deployment of that bay, the cartridge drive 138 is operated to move the strut stack upwardly to bring the next set of guide nodes 142 into deployable position.

When the entire truss is deployed, the position shown in FIG. 9 is reached. All bays are deployed, with sufficient overlap remaining between the truss and the guide rails for structural rigidity.

Clearly, the deployment system of this invention is useful with a variety of truss arrangements in addition to the two preferred embodiments detailed above. Other applications, variations and ramifications of this invention will occur to those skilled in the art upon reading this disclosure. Those are intended to be included within the scope of this invention as defined by the appended claims.

I claim:

1. Means for moving tube node fittings along a rail from first closely spaced positions to second widely spaced positions which comprises:
   at least one guide rail including means for guiding tube fittings for movement therealong from a first locked position to a second position;
   an endless tape threaded around a drive sprocket and an idler sprocket, said tape between said sprockets being substantially parallel to said guide rail;
   drive means to selectively move said tape in either direction;
   unlocking means on said tape for unlocking means locking said fittings in said first position as said unlocking mean is moved with said tape past said fitting;
   latch means on said tape for engaging said fitting so that said fitting is moved from said first position to said second position as said tape is moved;
   said latching mean adapted to release said fitting upon reversal of tape movement direction when said fitting has reached said second position;
   wherein all fittings may sequentially be unlocked and moved along said guide rail from first to second positions.

2. The means according to claim 1 wherein:
   said fitting is locked in said first position by a notched pivoted arm on said fitting biased toward said tape to bring said arm notch into locking engagement with a pin on said guide rail;
   said unlocking means includes a ramp means secured to said tape adapted to contact said arm to pivot said arm against said biasing force to disengage said arm notch from said pin.

3. The means according to claim 1 wherein said latching means comprises:
   a latch arm pivotably mounted on said tape;
   means biasing the free end of said latch arm to a position slightly above the tape;
   fitting notch means on said fitting adapted to engage said latch arm when said latch arm is moved past said fitting in the direction of said second position and release said latch arm when said latch arm is moved in the opposite direction.

4. In a deployable truss system comprising a pair of guide rails; a plurality of struts folded and packed in between said guide rails; node fittings connected to said struts and adapted to move along said guide rails; node fitting lock mean for holding said struts in said packed position and deployment mean to move said struts from the packed position to a deployed position in which the truss is fully formed; the improvement comprising:
   a drive sprocket and an idler sprocket mounted in spaced relationship along each guide rail adjacent to the packed struts;
   an endless drive tape entrained over said sprockets;
   drive means operatively connected to said drive sprockets to selectively move said tape in either direction;
   drive latch means on each tape for sequentially unlocking each fitting, latching to said fitting, moving said fitting to said second position and returning to the next fitting.

5. The improvement according to claim 4 wherein said drive latch means comprises
   a pivotable lock arm on each fitting movable between a first position in which a notch along said arm lockingly engages a pin on said guide rail and a second released position;
   ramp mean on said tape adapted to engage said arm as said tape moves said ramp means past said arm to move said arm from the locked to the released position;
   latch arm means on said tape including a protuberance extending toward said fitting;
   notch means on said fitting adapted to latchingly engage said protuberance when said latch arm is moved in the direction from said strut packed toward said strut deployed position and release said protuberance when said latch arm is returned toward said strut packed position.

6. In a deployable truss structure comprising a pair of guide rails; a plurality of struts packed in a planar array between two substantially parallel spaced guide rails with at least some struts folded at about their midpoints; node fittings connected to said struts and adapted to be moved along said guide rails; lift means for erecting diagonal struts half of which are folded and half of which are rigid to form vertical diamond truss shapes substantially perpendicular to said guide rails and means for unfolding other struts and for moving said node fittings along said guide rails to complete deployment of the truss structure; the improvement wherein said lift means comprises:
   a pair of support arms pivotably mounted on said guide rails, extending over the packed struts array;
   a channel member extending between the outer ends of said arms in contact with the rigid diagonal struts;
   a plurality of hook means pivotably mounted on said channel, each movable between a fixed position locked around a pair of adjacent rigid diagonal struts and a second position out of engagement with those struts;
   arm drive means to lift said arms, channels and struts locked thereto from the packed position to an erect deployed position;
   hook drive means to move said hooks from the locked to the unlocked position after strut erection so that further truss deployment can proceed.

7. The improvement according to claim 6 wherein all the upper diagonal struts on one guide rail and all of the lower diagonal struts on the other guide rail are rigid; with one of said lift means mounted on the upper surface of said strut pack and another on the lower surface of said strut on the guide rail to which said rigid diagonal struts are attached.

* * * * *